United States Patent [19]

Heck et al.

[11] Patent Number: 4,732,296
[45] Date of Patent: Mar. 22, 1988

[54] TRACK FEED ARRANGEMENT FOR AN AUTOMATIC SCREW FEEDING MACHINE

[76] Inventors: Michael Heck, 302 NE. 36th St., Boca Raton, Fla. 33432; Nathan Singer, 5710 NW. 54th Way, Tamarac, Fla. 33319

[21] Appl. No.: 744,630
[22] Filed: Jun. 14, 1985
[51] Int. Cl.⁴ .............................................. B23Q 7/12
[52] U.S. Cl. ................................... 221/172; 221/278; 221/183; 227/119
[58] Field of Search ................. 221/165, 163, 171–173, 221/183–184, 278; 227/112, 116, 119, 120; 81/430, 435, 57.37

[56] References Cited

U.S. PATENT DOCUMENTS

| | | | |
|---|---|---|---|
| 2,617,987 | 11/1952 | Robinson | 221/235 X |
| 3,324,697 | 6/1967 | Reiley | 227/112 X |
| 4,101,054 | 7/1978 | Frost et al. | 221/278 |
| 4,495,841 | 1/1985 | Mori et al. | 81/57.37 X |

FOREIGN PATENT DOCUMENTS

| | | | |
|---|---|---|---|
| 931557 | 8/1955 | Fed. Rep. of Germany | 221/278 |
| 307397 | 8/1955 | Switzerland | 221/184 |

*Primary Examiner*—Charles A. Marmor
*Attorney, Agent, or Firm*—Richard M. Saccocio

[57] ABSTRACT

A gravity fed, track arrangement for assemblying orienting, and aligning a plurality of fasteners for use with an automatic screw feeding machine is disclosed. Inclined tracks having a space therebetween are provided with a pivotable stabilizing bar which bears upon the heads of the fasteners within the tracks. Vibrations are induced into the stabilizing bar and the tracks so as to assist gravity in urging the fasteners down the tracks and so as to continually act to maintain the alignment position of the fasteners within the tracks. Track purging apparatus is provided whereby any misaligned fastener is purged from the tracks.

8 Claims, 4 Drawing Figures

U.S. Patent  Mar. 22, 1988  4,732,296
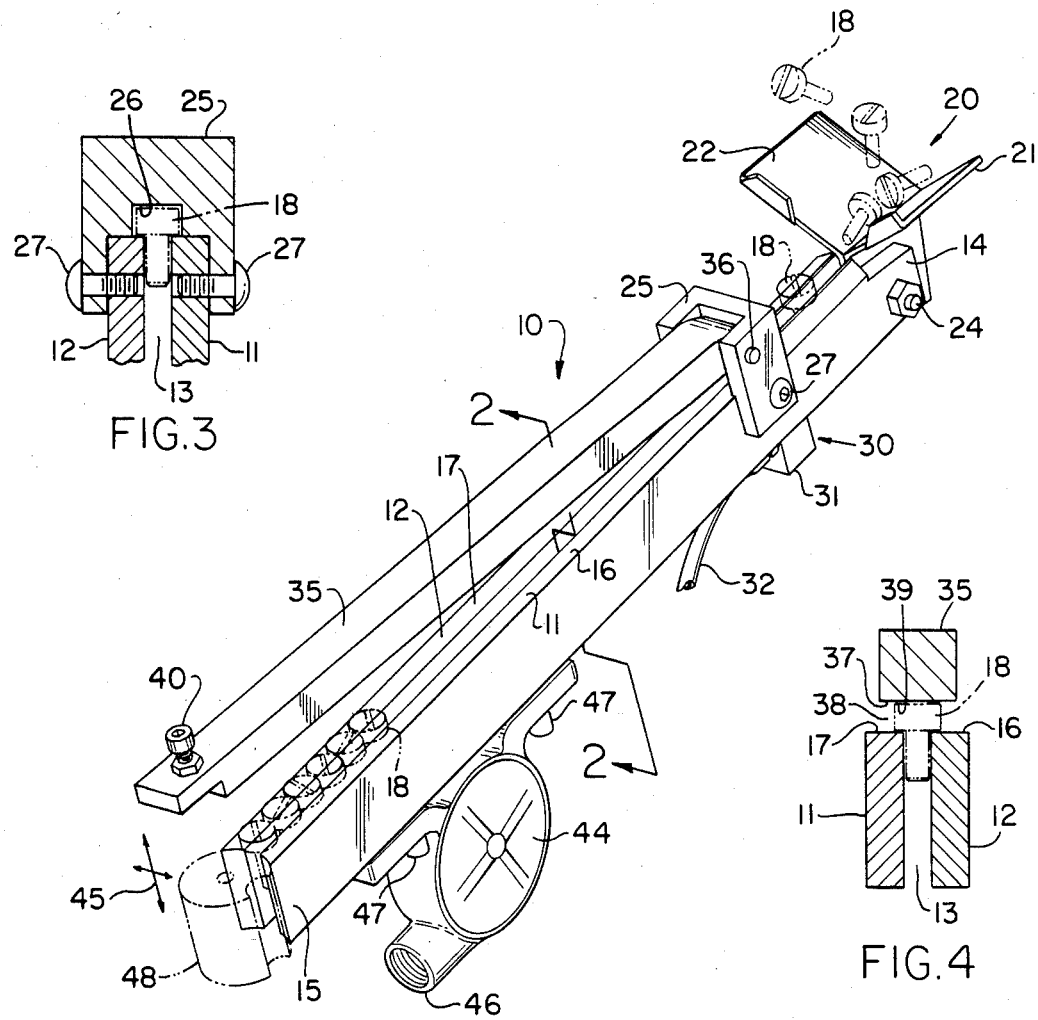
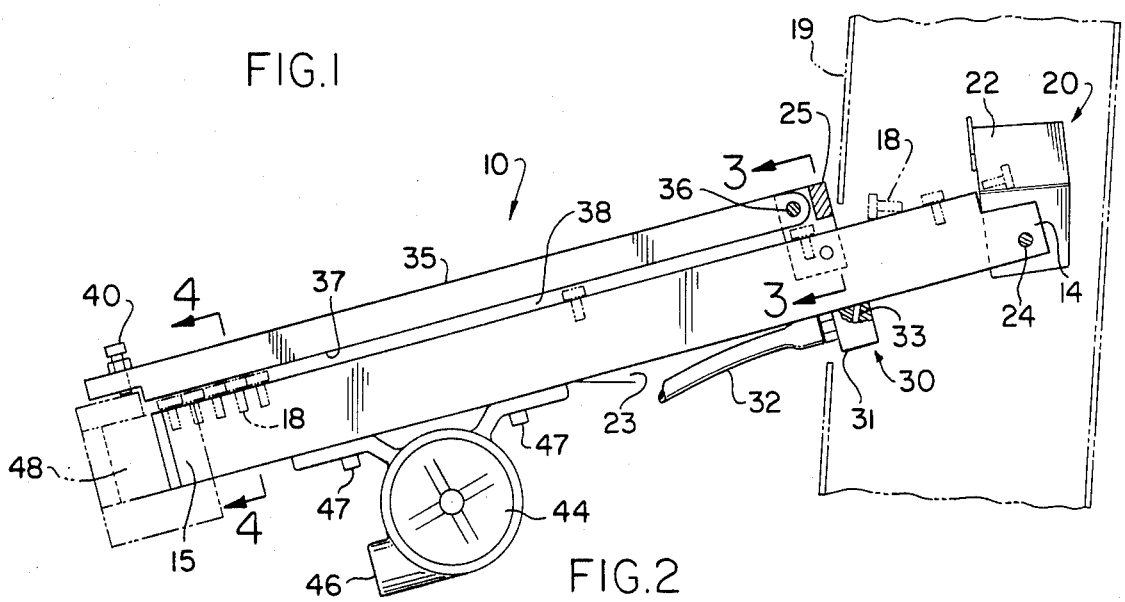

TRACK FEED ARRANGEMENT FOR AN AUTOMATIC SCREW FEEDING MACHINE

CROSS REFERENCE TO RELATED APPLICATIONS

This invention is related to co-pending patent applications entitled "Escapement Apparatus for an Automatic Screw Feeding Machine" and "Driver Jaws for an Automatic Screw Feeding Machine," by Michael Heck and Nathan Singer.

BACKGROUND OF THE INVENTION

1. Field of the Invention

This invention relates in general to the field of automatic screw feeding machines and in particular to the field of track feeding arrangements, whereby the fasteners are delivered to a driver head of an automatic screw feeding machine and even more particularly to a gravity fed track arrangement for an automatic screw machine.

2. Description of the Prior Art

An automatic screw feeding machine is the terminology which is commonly applied to a machine which arranges fasteners, such as screws, from a bulk, loose form into an arrangement whereby the fasteners are aligned and then individually delivered to a driver head. The driver head is then utilized to drive a single fastener within a pre-existing hole so as to fasten one component to another. The purpose of such machines is, of course, to speed up production by providing rapid fastening of two or more components. Since speed of production is the main objective of such machines, any portion of the machine which tends to jam or malfunction in any manner results in a work stoppage which is contrary to such main objective. Each operation performed upon a fastener which is being utilized within the machine from its bulk supply disposition to its fastened disposition and any point therebetween must necessarily occur in a serial mode whereby one step follows the other. Any one step, therefore, if it is not accomplished properly, will cause a complete shutdown of the machine and production. In today's modern factories, any production shutdown due to a malfunctioning machine must be avoided at all reasonable costs.

Screws or other similar fasteners used in industry are mass produced. Mass production generally involves greater tolerances for a given characteristic such as fastener head height, head diameter, or shank diameter, than corresponding individualized custom machining of screws. Automatic screw feeding machines must accommodate such mass-produced fasteners. The greater tolerances of mass-produced fasteners thereby impose relatively difficult, individualized tasks on automatic screw feeding machines.

One area where an automatic screw feeding machine of the prior art experiences difficulty is in arranging the screws or other fasteners from a bulk disposition to the point where a single fastener is fed to escapement apparatus which then feeds the single fastener to a driver head of the machine. It is generally known in the prior art machines for a rotating drum to contain a large number of fasteners which in accordance with the rotation of the drum are placed onto a track mechanism. The track mechanism orients and aligns each of the fasteners into a single row and through the use of gravity moves the fasteners down the track whereupon the lead fastener is then delivered to pneumatic apparatus. The pneumatic apparatus feeds each of the screws or fasteners, when demanded, to the driver head of the automatic screw feeding machine.

The relative complex and awkward geometry of the various types of screw fasteners does not generally lend the fasteners to a desired alignment and orientation on the track mechanism. The necessity for the track arrangement to feed the screws to the pneumatic apparatus, as stated previously, involves motion of the screws along the track arrangement. The motion of the screws further complicates an already difficult task. The shanks of the screws fit between an opening in the track mechanism while the underpart of the heads of the fasteners rests on the top surfaces of the tracks. The heads of the fasteners butt up against one another while the screw shanks are spaced apart from each other. The space between adjacent screw shanks in combination with the travel motion of the fasteners and the friction between the underside of the head of the fasteners and the top surface of the tracks tend to cause the fasteners to rock or pivot about their heads during the travel down the track arrangement. The rocking results in misalignment and on occasion interference between the heads of adjacent fasteners, which further results in increased friction and resistance to travel down the tracks. Invariably, one or more of the fasteners then become further misoriented or misaligned within the track mechanism. The friction and interference becomes greater, causing further misalignment and ultimately, jamming of the screws within the track mechanism. The end result is production must be shutdown until the jamming is eliminated. The frequency of jamming and the accompanying production stoppage in the prior art, due to the prior art machines, is a very significant problem.

Accordingly, a new, different, and improved gravity track feeding arrangement is desired which decreases the tendency for mass produced fasteners to become misoriented and thereby jam while being fed to additional apparatus which further feeds the fasteners to the driver head of an automatic screw feeding machine. It is also desirous to provide an improved arrangement for loading the fasteners onto the track mechanism with a view toward minimizing the possibility of jamming of the screw feed mechanism.

It is to be noted and especially recognized that there are other objects of the present invention which, although not specifically stated but which objects will be obvious to those skilled in the art to which this invention pertains, are intended to be included within the scope of the present invention.

SUMMARY OF THE INVENTION

The present invention accomplishes the above-stated objects, in addition to others, by providing a gravity fed, track arrangement for fasteners for an automatic screw feeding machine.

A pair of spaced tracks comprising elongated bars with a space therebetween is functionally connected at one end to a drum arrangement or other appropriate reservoir containing a plurality of fasteners and functionally connected at the other end to escapement apparatus which subsequently feeds individual screws to the driver head of the automatic screw machine. The track is angled relative to the horizon so that gravity may be utilized to move the fasteners along the track. The portion of the track within the rotating drum is provided with a track ejector mechanism. The track ejector mechanism periodically purges the fasteners then within or on the track so as to eliminate or purge any misaligned fastener. One end of a track mount is also located within the rotating drum. The track mount permits only those fasteners which are properly oriented within the tracks to pass therethrough. The other portion of the track mount extends out from the rotating drum. A floating stabilizer bar is pivotally attached to the extended end of the track mount. The stabilizer bar comprises an elongated bar oriented along the lines of the track. The lower surface of the stabilizer bar rests on top of the head of the fasteners traveling within the space between the tracks. Vibrator apparatus is functionally connected to the stabilizer bar such that vibrations are induced in the stabilizer bar. The vibrator apparatus is also functionally attached to the track such that vibrations are also induced within the track. The combined effects of the vibrations and the floating stabilizer bar serve to provide proper orientation and alignment of the fasteners within the tracks and the continuous uninterrupted travel of the fasteners along the tracks of the arrangement. These favorable conditions result in virtually jam-free travel and delivery of the fasteners to the next station of an automatic screw feeding machine.

Various other objects, advantages, and features of the invention will become apparent to those skilled in the art from the following discussion taken in conjunction with the following drawings, in which:

BRIEF DESCRIPTION OF THE DRAWINGS

FIG. 1 is an isometric view of the inventive track apparatus illustrating a preferred embodiment thereof;

FIG. 2 is a side view of the track apparatus of FIG. 1, taken along the line 2—2 thereof;

FIG. 3 is a cross-sectional view of the track apparatus of FIG. 1, taken along the line 3—3 thereof; and, FIG. 4 is a cross-sectional view of the track apparatus of FIG. 1, taken along the line 4—4 thereof.

DESCRIPTION OF THE PREFERRED EMBODIMENTS

Reference is now made to the drawings where like characteristics and features of the various figures are denoted by like reference characters.

The inventive track apparatus 10 comprises a pair of elongated bars or tracks 11 and 12 which are separated by a space 13 therebetween. Tracks 11 and 12 are generally oriented with end portion 14 positioned at a higher elevation than end portion 15 such that the longitudinal axis of tracks 11 and 12 form an appropriate angle 23 of approximately 15° with regard to the horizon when mounted upon the base of an automatic screw feeding machine (not shown). Tracks 11 and 12 are further oriented relative to each other such that the upper surfaces 16 and 17 of tracks 11 and 12 lay in the same plane. Space 13 has a width slightly greater than the shank diameter of the fasteners 18 adapted to fit therewithin. The width of space 13 is further designed such that is is appropriately smaller than the diameter of the head of the fasteners 18 so that the fasteners 18 cannot fall within space 13. The parameters used in sizing of space 13 are well known in the art. End portion 14 of tracks 11 and 12 fits within a rotating drum 19 or other appropriate well-known type of reservoir which is schematically shown in the drawings by a dashed line.

A trough arrangement comprising a drop 20 comprising a pair of angled plates 21 and 22 is attached by fastener 24 to end 14 of tracks 11 and 12 within drum 19.

As drum 19, which contains a plurality of fasteners 18 in loose, bulk form rotates, a number of fasteners 18 fall onto the angled surfaces of plates 21 and 22. The angled configuration of drop 20 causes fasteners to orient themselves within the vee joint of the drop 20 and along the longitudinal axis of tracks 11 and 12. And, because screw fasteners 18 have a shank which is heavier than the head thereof, fasteners 18 will tend to pivot about the heads causing the shanks to fall within space 13 with the heads resting on surfaces 16 and 17 of tracks 11 and 12 within drum 19. Since tracks 11 and 12 extend within drum 19, a plurality of fasteners 18 are continuously arranged and properly aligned within space 13 within drum 19. Because of the many variables involved, on occasion, a fastener 18 will become loaded onto tracks 11 and 12 in a misaligned position, the track ejector apparatus 30 of the present invention as described and explained below, corrects this situation.

A track mount 25 having an inverted U configuration is attached by screw 27 to tracks 11 and 12 such that a small portion of track mount 25 extends within drum 19 as shown in the figures. A channel 26 is provided within the U-shaped opening of track mount 25. Channel 26, in combination with space 13, forms a T-shaped opening which is slightly greater than the cross-sectional configuration of screw fasteners 18. Thus, in order for a fastener 18 to pass within the combined opening created by channel 26 and space 13, each fastener 18 must be properly aligned relative to tracks 11 and 12. A misaligned fastener 18 will not pass through the combined opening 16 and 13. Naturally, any fasteners behind such misaligned fastener cannot travel down tracks 11 and 12.

Track ejector apparatus 30 corrects for misaligned fasteners and comprises a housing 31 attached to the underside of bars 11 and 12 within drum 19, to which is attached a pneumatic hose 32. An opening 33 within housing 31 is positioned to be aligned to space 13 between bars 11 and 12 at the entrance to channel 26 of track mount 25. At predetermined intervals of time, a burst of air is ducted through hose 32 and through opening 33 and further through space 13 so as to blow away and clear all fasteners 18 from tracks 11 and 12 within drum 19. In this manner, any misaligned fastener is also cleared from tracks 11 and 12 of the inventive track arrangement 10.

In prototype testing, it has been determined that very satisfactory operation results if the track arrangement 10 is purged every time after the lead fastener 18 leaves the inventive track arrangement 10. Tracks 11 and 12 are sufficiently long so as to contain a relatively large number of fasteners 18 along the length thereof, for example, twenty-to-forty fasteners. In the unlikely event that another fastener is misaligned relative to tracks 11 and 12 within drum 19 and immediately after a first misaligned fastener 18, purging by track ejector apparatus 30 will also blow the second misaligned fastener from the inventive track arrangement 10. The effect of such action is to merely cause a space of approximately two fasteners 18 from the entrance of track mount 25 to the next fastener 18 downstream of the entrance to track mount 25. As drum 19 continues to rotate and drop 20 continues to orient fasteners 18 within space 13 of tracks 11 and 12 within drum 19 between purges by track ejector 30, the space occupied by the two missing screws is quickly filled up. In this manner, a continuous line of readily available fasteners 18 are provided within the portion of tracks 11 and 12 which extend out of drum 19.

A floating stabilizer bar 35 is pivotally attached by pivot pin 36 to an end of track mount 25 which extends out of drum 19. Stabilizer bar 35 comprises an elongated bar which may have a substantially rectangular cross-sectional shape and oriented such that its longitudinal axis is aligned parallel to the longitudinal axis of the inventive track arrangement 10. The cross-sectional shape and the weight of stabilizer bar 35 may be appropriately varied in accordance with the size and type of fasteners 18 being used with the inventive apparatus 10. The lowest surface 37, which is flat, is arranged substantially parallel to and spaced from top surfaces 16 and 17 of bars 11 and 12. The height of space 38 is substantially that of the height of the head of fasteners 18. Accordingly, the lowest surface of stabilizer bar 35 is intended to rest upon the upper surface 39 of the head of screw fasteners 18. In the event that fasteners 18 comprise a double-shanked fastener, the stabilizer bar is intended to rest upon the upper surface of the upper shank. Stabilizer bar 35, due to its weight and pivoting action 36 in bearing upon the heads of fasteners 18, serves to precisely maintain the correct and proper alignment of successive fasteners 18 within space 13 of the track arrangement 10. Since each fastener is caused to be pressed against the upper surfaces 16 and 17 of tracks 11 and 12 by stabilizer bar 35, each fastener must necessarily be properly positioned and aligned relative to tracks 11 and 12. Hence, the entire number of fasteners 18 within tracks 11 and 12 are properly aligned relative to each other and to tracks 11 and 12. A screw or other appropriate adjustment device 40 located at the tip of stabilizer bar 35 may be used to precisely fix the height of space 38. Because of the weight of floating stabilizer bar 35 and the geometry provided by the same, it is, accordingly, substantially impossible for any screw fastener 18 to become misaligned within space 13 outside of drum 19. In practice, it may be difficult to position the stabilizer bar 35 such that it bears against each fastener within tracks 11 and 12. In this event, the adjustment device 40 may be used to adjust space 38 so that the bottom surface 37 of stabilizer bar 35 bears against or on at least one or more lead fasteners 18 located at portion 15 of tracks 11 and 12.

A vibrating mechanism or other appropriate motion-imparting apparatus 44 is attached, for example, by screws 47 to tracks 11 and 12, approximately midway between exit from drum 19 and the end portion 15 of tracks 11 and 12. Vibrator apparatus may comprise a pneumatically-driven vibrating cam or an electrically-driven cam. Such energizing source may be connected to fitting 46. It is preferred that the frequency and pitch of the vibrations be adjustable. Vibrating apparatus 44 functions to vibrate tracks 11 and 12 as well as the floating stabilizer bar 35 in the direction indicated by arrows 45. That is, in a direction parallel to and perpendicular to the direction of travel of fasteners 18 and the longitudinal axis of stabilizer bar 35. The vibrations induced in stabilizer bar 35 serve a very significant purpose. The vertical vibrations actually cause stabilizer bar 35 to repeatedly lift off of and rebear upon the heads of fasteners 18 within space 13 in an alternating manner. Accordingly, fasteners 18 are permitted to continue their downward descent within tracks 11 and 12 while free from the weight of stabilizer bar 35. Subsequent recontact of stabilizer bar 35 with the head fasteners 18 corrects any misalignment of the fasteners 18 which may have occurred during the time of unrestricted travel. This continuous freedom of travel and subsequent realignment continues many times a minute such that the result is continuous travel of fasteners 18 and the maintenance of proper alignment of fasteners 18. The horizontal vibrations induced in tracks 11 and 12 in combination with the force of gravity, further urge the travel of the fasteners down tracks 11 and 12. It is to be understood that any mechanical action which causes the stabilizer bar 35 to alternately lift off and rebear upon the head of fasteners 18 on a periodic basis is intended to be included within the scope of this invention.

An escapement mechanism which is not pertinent to this invention is provided at end 15 of tracks 11 and 12. The escapement apparatus 48 is schematically shown by the dashed lines at end 15 of the inventive track arrangement 10. The downward motion imparted to fasteners 18 causes the lead fastener 18 to be delivered to escapement apparatus 48 upon demand as a fastener is inserted by the automatic screw feeding machine. When so delivered, the fastener immediately behind the lead fastener which is then ready to be delivered to escapement mechanism 48. The described delivery arrangement continuously repeats itself such that a continuous flow of properly aligned fasteners 18 is provided.

While this invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. A gravity assisted track arrangement for an automatic screw feeding machine adapted for use with a plurality of fasteners, comprising a pair of spaced tracks, the shanks of said fasteners being positioned within the space between said tracks with the bottom of the heads of said fasteners fitting against said tracks, said tracks being inclined at an angle to the horizontal, means attached to said tracks for stabilizing the alignment of said fasteners within and on said tracks, comprising an elongated bar member mounted for pivotal rotation relative to said tracks, said bar member being aligned substantially parallel to the longitudinal axis of said tracks and spaced above said tracks whereby the lower surface of said elongated bar rests upon the upper surface of at least one or more of the lead fasteners within said tracks and the underside surfaces of said fasteners rest substantially flat against the upper surfaces of said tracks and means for causing alternating, periodic bearing and lift off of said stabilizing means on said fasteners within said track.

2. The apparatus of claim 1 wherein said stabilizing means further comprises an adjustment means for adjusting the space between said lower surface of said elongated bar and the upper surfaces of said tracks.

3. The track arrangement of claim 2, wherein said means for inducing alternating periodic bearing and lift off of said stabilizing means comprises vibrator apparatus.

4. The apparatus of claim 1, wherein said track arrangement further comprises alignment apparatus upstream of said stabilizing means having an opening therethrough slightly larger than the cross-sectional shape of the said fasteners, said opening being positioned relative to said tracks whereby only a properly aligned fastener positioned on said tracks can pass therethrough.

5. The apparatus of claim 4, wherein said track arrangement comprises purging means for purging said fasteners from said tracks, said purging means being connected to said tracks upstream of said alignment apparatus.

6. The apparatus of claim 1, wherein said track arrangement further comprises purging means for purging said fasteners from a portion of said tracks upstream of the entrance end of said stabilizing means.

7. The apparatus of claim 6, wherein said fasteners are purged at predetermined time intervals each occurring after the lead fastener is removed from said tracks.

8. The track arrangement of claim 6, wherein said purging means comprises, a source of pressurized gas, a valve flow connected to said pressurized gas, a housing attached to said tracks, an opening through said housing flow connected at one end to said pressurized gas and said valve, the other end of said opening in said housing being directed toward said fasteners in said tracks whereby when said valve is opened, the fasteners within and on the tracks are blown by the pressurized gas out of and off of the tracks.

* * * * *